United States Patent
Shimizu et al.

(10) Patent No.: US 11,971,200 B2
(45) Date of Patent: Apr. 30, 2024

(54) HEAT PUMP APPARATUS WITH COMPRESSOR HEATING CONTROL

(71) Applicant: Mitsubishi Electric Corporation, Tokyo (JP)

(72) Inventors: Yuichi Shimizu, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 159 days.

(21) Appl. No.: 17/781,285

(22) PCT Filed: Jan. 15, 2020

(86) PCT No.: PCT/JP2020/000953
§ 371 (c)(1),
(2) Date: May 31, 2022

(87) PCT Pub. No.: WO2021/144869
PCT Pub. Date: Jul. 22, 2021

(65) Prior Publication Data
US 2022/0412612 A1 Dec. 29, 2022

(51) Int. Cl.
*F25B 49/02* (2006.01)
*F25B 30/02* (2006.01)

(52) U.S. Cl.
CPC ............ *F25B 30/02* (2013.01); *F25B 49/022* (2013.01); *F25B 49/025* (2013.01);
(Continued)

(58) Field of Classification Search
CPC ........ F25B 30/02; F25B 49/02; F25B 49/022; F25B 49/025; F25B 2600/021; F25B 2600/024; F25B 2700/151
See application file for complete search history.

(56) References Cited

U.S. PATENT DOCUMENTS

| | | | |
|---|---|---|---|
| 9,829,226 B2 | 11/2017 | Hatakeyama et al. | |
| 10,605,500 B2 | 3/2020 | Kamiya et al. | |
| 2014/0338380 A1* | 11/2014 | Kamiya | F25B 49/025 62/129 |

FOREIGN PATENT DOCUMENTS

| | | |
|---|---|---|
| AU | 2011358803 B2 | 8/2012 |
| CN | 104024765 A | 9/2014 |

(Continued)

OTHER PUBLICATIONS

Office Action dated Mar. 28, 2023 issued in corresponding Japanese Patent Application No. 2021-571099 (and English machine translation).

(Continued)

*Primary Examiner* — Jonathan Bradford
(74) *Attorney, Agent, or Firm* — POSZ LAW GROUP, PLC

(57) ABSTRACT

A heat pump apparatus includes: a compressor including a motor; an inverter that applies a desired voltage to the motor; a current detector that detects current flowing to the motor; a drive-signal generation unit that generates a drive signal for the inverter; a magnetic-pole position estimation unit that changes a voltage phase of a voltage command value for a high-frequency voltage, and estimates a maximum-heat-amount acquisition magnetic-pole position when the generation unit applies the high-frequency voltage to the motor to heat the compressor; a steady heating control unit that determines an amplitude and voltage phase of the voltage command value from the maximum-heat-amount acquisition magnetic-pole position and a defined necessary amount of heat when the generation unit applies the high-frequency voltage to the motor to heat the compressor; and a control switching determination unit that causes one of the estimation unit and the heating control unit to operate.

10 Claims, 11 Drawing Sheets

(52) U.S. Cl.
CPC ... *F25B 2600/021* (2013.01); *F25B 2600/024* (2013.01); *F25B 2700/151* (2013.01)

(56) References Cited

FOREIGN PATENT DOCUMENTS

| JP | 2005-130582 A | 5/2005 |
|----|---------------|--------|
| JP | 2015-029383 A | 2/2015 |
| JP | 2015-154620 A | 8/2015 |
| WO | 2012/107987 A1 | 8/2012 |
| WO | 2012/147192 A | 11/2012 |
| WO | 2013/102999 A | 7/2013 |

OTHER PUBLICATIONS

International Search Report of the International Searching Authority dated Mar. 10, 2020 in connection with application No. PCT/JP2020/000953 (and English translation).

Office Action dated Oct. 21, 2023 issued in corresponding Chinese Patent Application No. 202080092505.9 (and English machine translation).

* cited by examiner

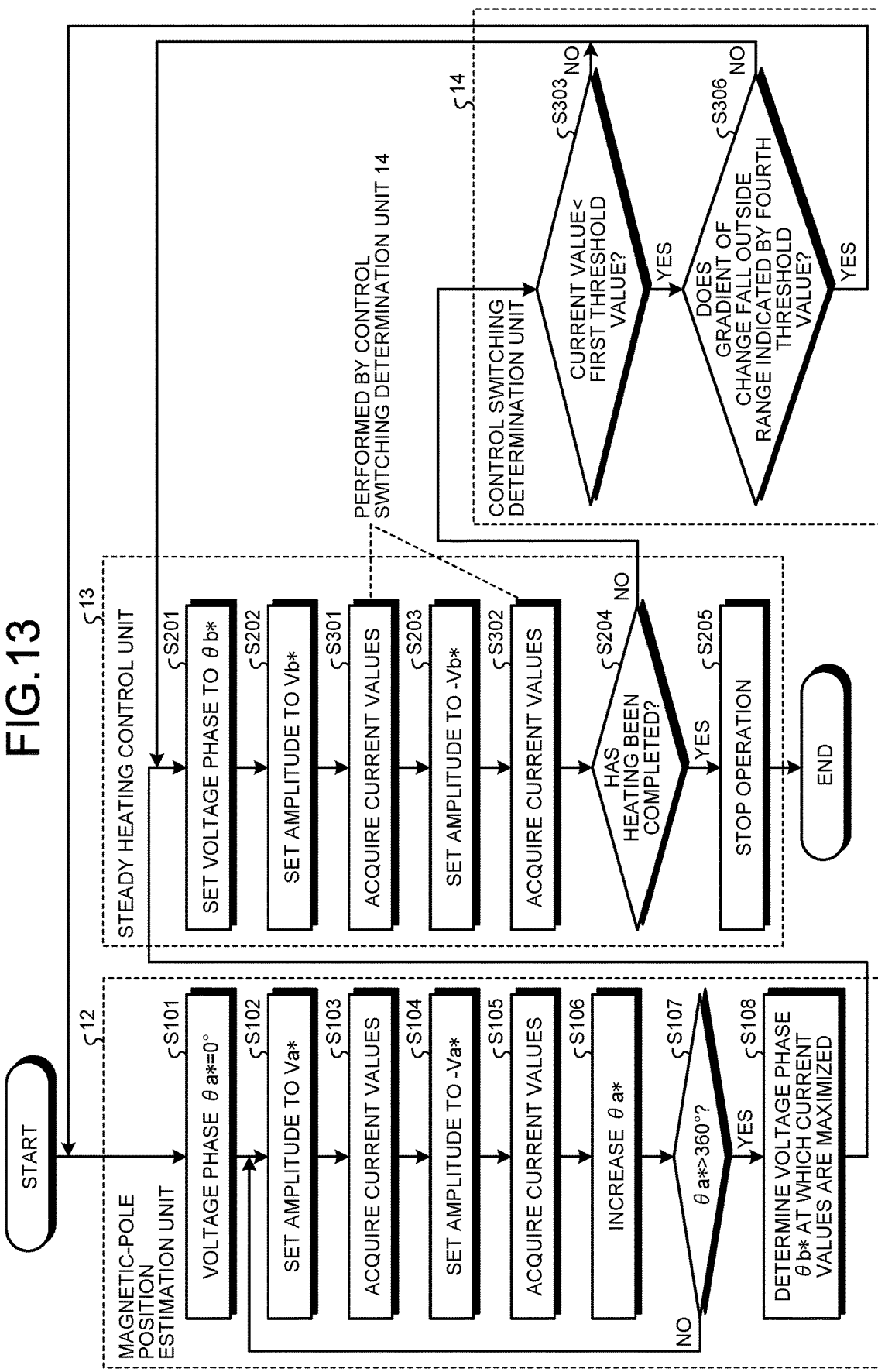

HEAT PUMP APPARATUS WITH COMPRESSOR HEATING CONTROL

CROSS REFERENCE TO RELATED APPLICATION

This application is a U.S. National Stage Application of International Patent No. PCT/JP2020/000953 filed on Jan. 15, 2020, the disclosure of which is incorporated herein by reference.

TECHNICAL FIELD

The present disclosure relates to a heat pump apparatus using a compressor.

BACKGROUND

Conventionally, some heat pump apparatuses avoid a refrigerant stagnation phenomenon by heating compressors so as to improve the start-up speed of air conditioners at the start of heating. For example, Patent Literature 1 discloses a technique in which a heat pump apparatus stably heats a compressor regardless of the stop position of a rotor of a motor of the compressor while the compressor is not in operation during heating operation of an air conditioner. The heat pump apparatus described in Patent Literature 1 applies, to the motor, a high-frequency voltage within a range in which the motor does not rotate, and uses, as a main heat source, iron loss of the motor caused by application of the high-frequency voltage.

PATENT LITERATURE

Patent Literature 1: WO 2013/102999 A

In the case of heating performed using motor iron loss, the amount of heat changes in accordance with the inductance of a rotor. The inductance of the rotor changes in accordance with the stop position of the rotor. In order to obtain a maximum amount of heat, therefore, it is necessary to detect or estimate the stop position of the rotor and appropriately energize the rotor in accordance with the stop position of the rotor. In the case of heating control with the compressor not in operation, the stop position of the rotor may change as torque is generated in the rotor when there is a difference in pressure between the outlet and inlet of a compressor due to the opening and closing of a valve located between and connected to pipes of a refrigeration cycle, and when the difference in pressure changes. In view of this, it is desirable to constantly estimate the stop position of the rotor in order to obtain the maximum amount of heat.

Patent Literature 1 describes a circuit that detects the current and voltage of the motor so as to detect the stop position of the rotor. A vector control method using motor current is widely known as a technique for rotating a motor of a heat pump apparatus. Motor current is also used for purposes other than estimation of the stop position of a rotor while motor voltage is used only for estimating the stop position of the rotor. The heat pump apparatus described in Patent Literature 1, which requires a motor voltage detection circuit for estimating the stop position of the rotor, poses a problem of an increase in circuit size, and thus an increase in size of the apparatus.

SUMMARY

The present disclosure has been made in view of the above, and an object of the present disclosure is to obtain a heat pump apparatus capable of efficiently heating a compressor while preventing an increase in circuit size.

In order to solve the above problem and achieve the object, a heat pump apparatus of the present disclosure includes: a compressor including a compression mechanism and a motor, the compression mechanism compressing a refrigerant, the motor including a rotor and driving the compression mechanism; a heat exchanger; an inverter that applies a desired voltage to the motor; a current detection unit that detects current flowing from the inverter to the motor; a drive-signal generation unit that generates a drive signal for the inverter; a magnetic-pole position estimation unit that changes a voltage phase of a voltage command value for a high-frequency voltage, and estimates a magnetic-pole position indicating a stop position of the rotor from a current value to estimate a maximum-heat-amount acquisition magnetic-pole position when the drive-signal generation unit applies the high-frequency voltage to the motor to heat the compressor, the motor being not capable of being rotatably driven with the high-frequency voltage, the high-frequency voltage being represented by a sine wave, the current value being a value of current detected by the current detection unit, a maximum amount of heat being acquired at the maximum-heat-amount acquisition magnetic-pole position; a steady heating control unit that determines an amplitude and voltage phase of the voltage command value from the maximum-heat-amount acquisition magnetic-pole position and a defined necessary amount of heat when the drive-signal generation unit applies the high-frequency voltage to the motor to heat the compressor; and a control switching determination unit that causes one of the magnetic-pole position estimation unit and the steady heating control unit to operate.

The heat pump apparatus according to the present disclosure has the effect of heating the compressor efficiently while preventing the increase in circuit size.

BRIEF DESCRIPTION OF DRAWINGS

FIG. 13 is a flowchart illustrating operation of an inverter control unit of a heat pump apparatus according to a fourth embodiment.

DETAILED DESCRIPTION

Heat pump apparatuses according to embodiments of the present disclosure will be hereinafter described in detail with reference to the drawings. Note that the present disclosure is not limited to the embodiments.

First Embodiment

Figure 1:
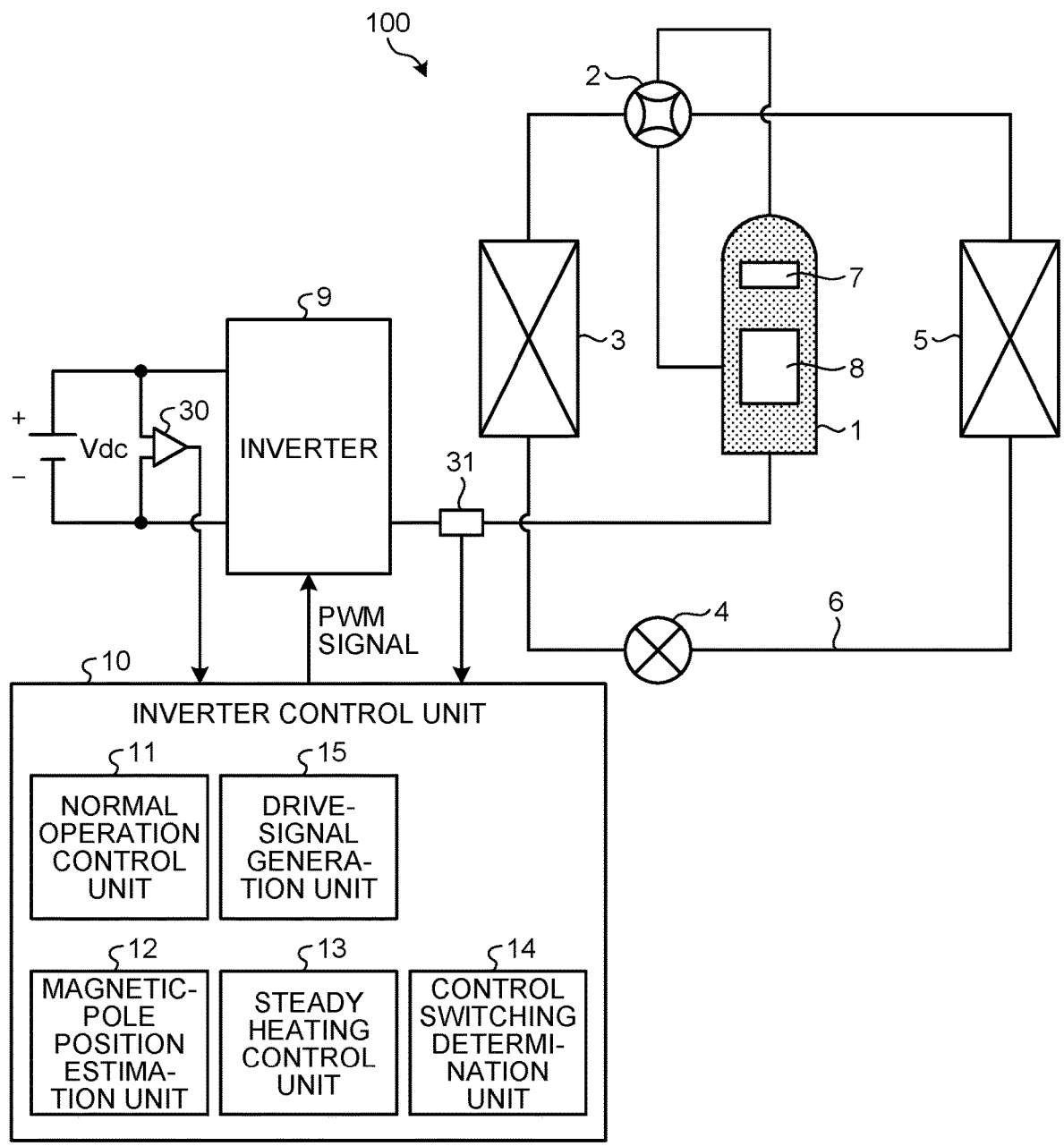
FIG. 1 is a diagram showing a configuration example of a heat pump apparatus according to a first embodiment.
Figure 2:
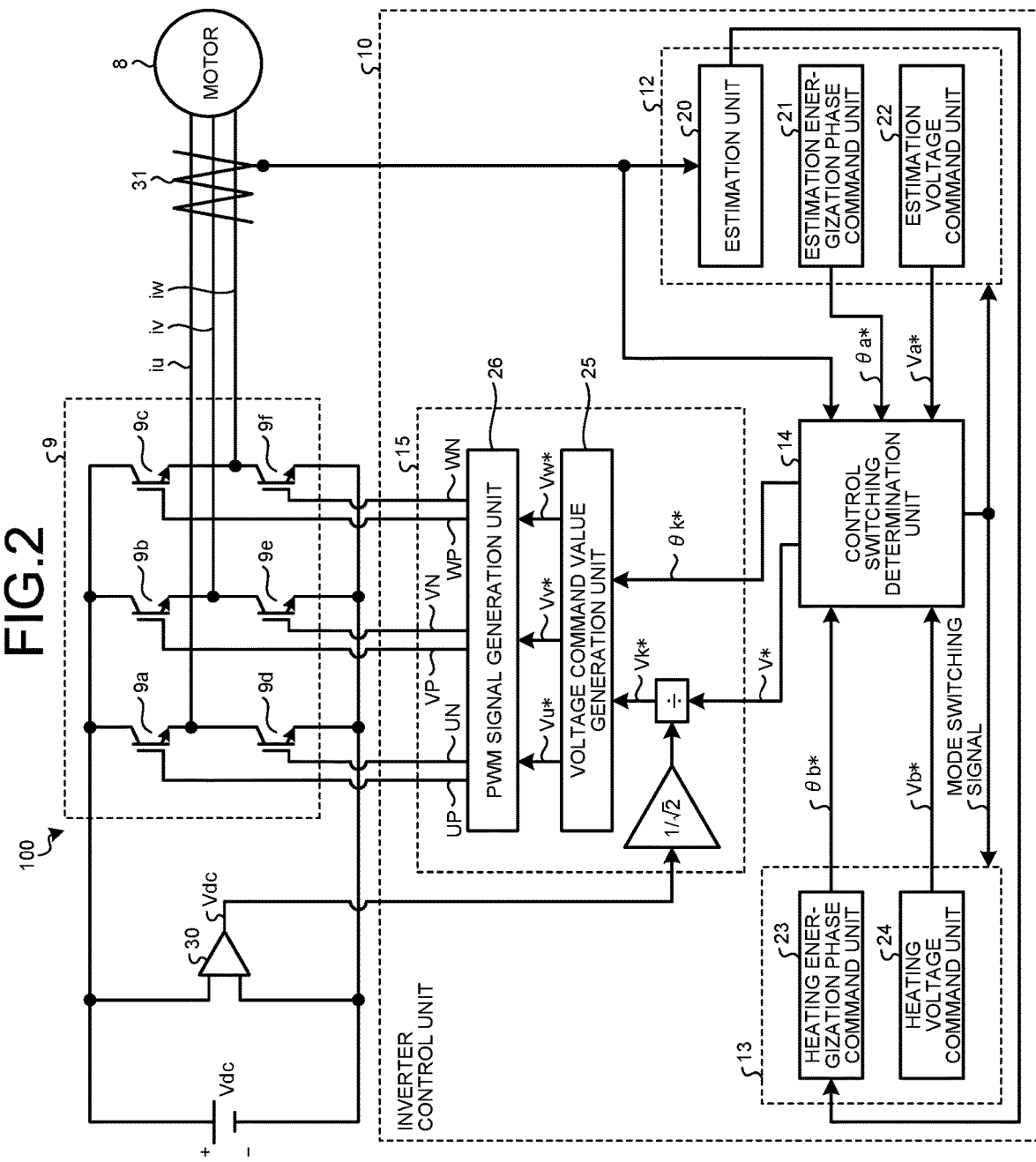
FIG. 2 is a diagram showing an example of a configuration of a main part of the heat pump apparatus according to the first embodiment.

FIG. 1 is a diagram showing a configuration example of a heat pump apparatus 100 according to a first embodiment. FIG. 2 is a diagram showing an example of a configuration of a main part of the heat pump apparatus 100 according to the first embodiment. The heat pump apparatus 100 provides, for example, an air conditioner. The heat pump apparatus 100 includes a refrigeration cycle. A compressor 1, a four-way valve 2, a heat exchanger 3, an expansion mechanism 4, and a heat exchanger 5 are connected in sequence via a refrigerant pipe 6 to form the refrigeration cycle. A compression mechanism 7 and a motor 8 are provided inside the compressor 1. The compression mechanism 7 compresses a refrigerant. The motor 8 drives the compression mechanism 7. The motor 8 includes a rotor (not illustrated). The motor 8 is a three-phase motor including windings for three phases, or a U-phase, a V-phase, and a W-phase.

In addition, the heat pump apparatus 100 includes an inverter 9, an inverter control unit 10, a voltage sensor 30, and a current detection unit 31. The inverter 9 is electrically connected to the motor 8. The inverter 9 applies a desired voltage to the motor 8. Specifically, the inverter 9 applies three-phase voltages Vu, Vv, and Vw to the U-phase, V-phase, and W-phase windings of the motor 8, respectively. The inverter 9 is electrically connected to the inverter control unit 10. The inverter control unit 10 generates an inverter drive signal, and outputs the inverter drive signal to the inverter 9. The inverter drive signal is a drive signal for driving the inverter 9, such as a pulse width modulation (PWM) signal, The inverter 9 includes six switching elements 9a, 9b, 9c, 9d, 9e, and 9f. The inverter 9 is a circuit in which three series-connection units each including two switching elements are connected in parallel. The inverter 9 uses a bus voltage Vdc as a power source to drive the switching elements 9a, 9b, 9c, 9d, 9e, and 9f in accordance with PWM signals UP, VP, WP, UN, VN, and WN, respectively, which are inverter drive signals output from the inverter control unit 10. As a result, the inverter 9 generates three-phase voltages Vu, Vv, and Vw, and applies the voltages Vu, Vv, and Vw to the U-phase, V-phase, and W-phase windings of the motor 8, respectively.

The switching elements 9a to 9f included in the inverter 9 are, for example, semiconductor switching elements such as insulated gate bipolar transistors (IGBTs) and metal oxide semiconductor field effect transistors (MOSFETs). The inverter 9 may be configured such that a freewheeling diode (not illustrated) is connected in parallel to the semiconductor switching elements for the purpose of reducing a surge voltage caused by switching. Note that the freewheeling diode may be a parasitic diode of a semiconductor switching element, but in the case of the MOSFET, it is also possible to achieve a similar function by turning on the MOSFET at the timing of circulation. In addition, it is possible to achieve low loss and high-speed switching by using, as material for the semiconductor switching elements, not only silicon (Si) but also a wide bandgap semiconductor such as silicon carbide (SiC), gallium nitride (GaN), gallium oxide ($Ga_2O_3$), or diamond.

The voltage sensor 30, which is provided on the input side of the inverter 9, that is, the supply side of the bus voltage Vdc, detects the bus voltage Vdc. The voltage sensor 30 outputs the detected bus voltage Vdc to the inverter control unit 10.

The current detection unit 31, which is provided on the output side of the inverter 9, detects three-phase motor currents iu, iv, and iw flowing from the inverter 9 to the motor 8. The current detection unit 31 may be configured to detect the currents with a resistor between each of the lower-side three-phase switching of the inverter 9 and the associated connection point, or may be configured to detect the currents with a resistor provided between each of the connection points of the lower-side three-phase switching elements and the negative side of the bus voltage Vdc. The current detection unit 31 can be implemented not only by using a method of detection from a voltage across a resistor, but also by using a current sensor using a current transformer, etc. The current detection unit 31 outputs, to the inverter control unit 10, detected values of the three-phase motor currents iu, iv, and iw, that is, current values for the three phases.

A configuration of the inverter control unit 10 will be described in detail. The inverter control unit 10 includes a normal operation control unit 11, a magnetic-pole position estimation unit 12, a steady heating control unit 13, a control switching determination unit 14, and a drive-signal generation unit 15. Note that FIG. 2 illustrates only elements that perform characteristic operation in the heat pump apparatus 100 of the present embodiment, and omits the normal operation control unit 11 illustrated in FIG. 1.

The normal operation control unit 11 is used when the heat pump apparatus 100 performs a normal operation. The normal operation control unit 11 controls the drive-signal generation unit 15 so as to cause the drive-signal generation unit 15 to output, as inverter drive signals, the PWM signals for rotatably driving the motor 8.

When the drive-signal generation unit 15 applies a high-frequency voltage to the motor 8 to heat the compressor 1, the magnetic-pole position estimation unit 12 changes a voltage phase θa* of a voltage command value Va* for the high-frequency voltage represented by a sine wave, the motor 8 being not capable of being rotatably driven with the high-frequency voltage. The magnetic-pole position estimation unit 12 estimates a magnetic-pole position indicating the stop position of the rotor of the motor 8 from the values of current detected by the current detection unit 31 to estimate a maximum-heat-amount acquisition magnetic-pole position at which a maximum amount of heat is acquired. The magnetic-pole position estimation unit 12 includes an estimation unit 20, an estimation energization phase command unit 21, and an estimation voltage command unit 22. The estimation unit 20 acquires the values of current from the current detection unit 31, and estimates the magnetic-pole position indicating the stop position of the rotor of the motor 8, on the basis of the values of current detected by the current detection unit 31. Furthermore, the estimation unit 20 estimates a magnetic-pole position where a maximum amount of heat is acquired, on the basis of the values of current detected by the current detection unit 31 and the estimated magnetic-pole position. In the following description, the magnetic-pole position where the maximum amount of heat is acquired may be referred to as a maximum-heat-amount acquisition magnetic-pole position or the like.

Figure 3:
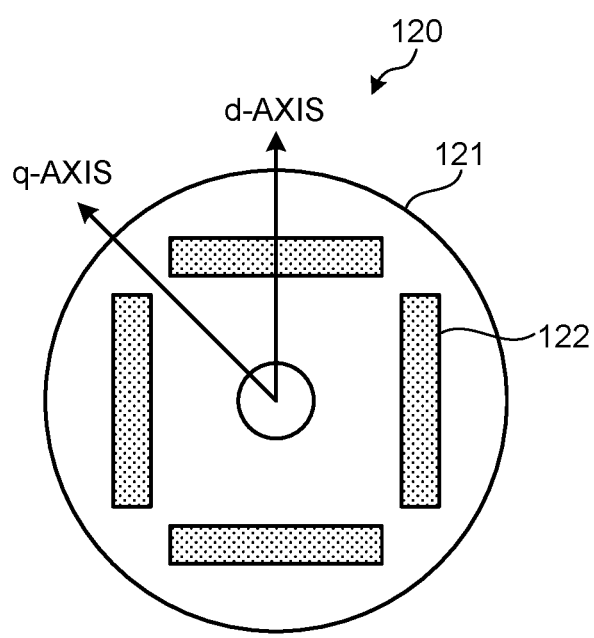
FIG. 3 is a diagram showing a configuration example of a rotor of a motor of the heat pump apparatus according to the first embodiment.

Here, a configuration of the rotor included in the motor 8 will be described. FIG. 3 is a diagram showing a configuration example of a rotor 120 of the motor 8 of the heat pump apparatus 100 according to the first embodiment. The rotor 120 of the motor 8 includes an iron core 121 and magnets 122. In such a configuration of the rotor 120, the length of a gap, that is, a distance between each magnet 122 and a stator (not illustrated) of the motor 8 changes depending on the stop position of the rotor 120 in the motor 8. Therefore, when seen from the stator side, the winding inductance of the motor 8 changes as illustrated in FIG. 4.

Figure 4:
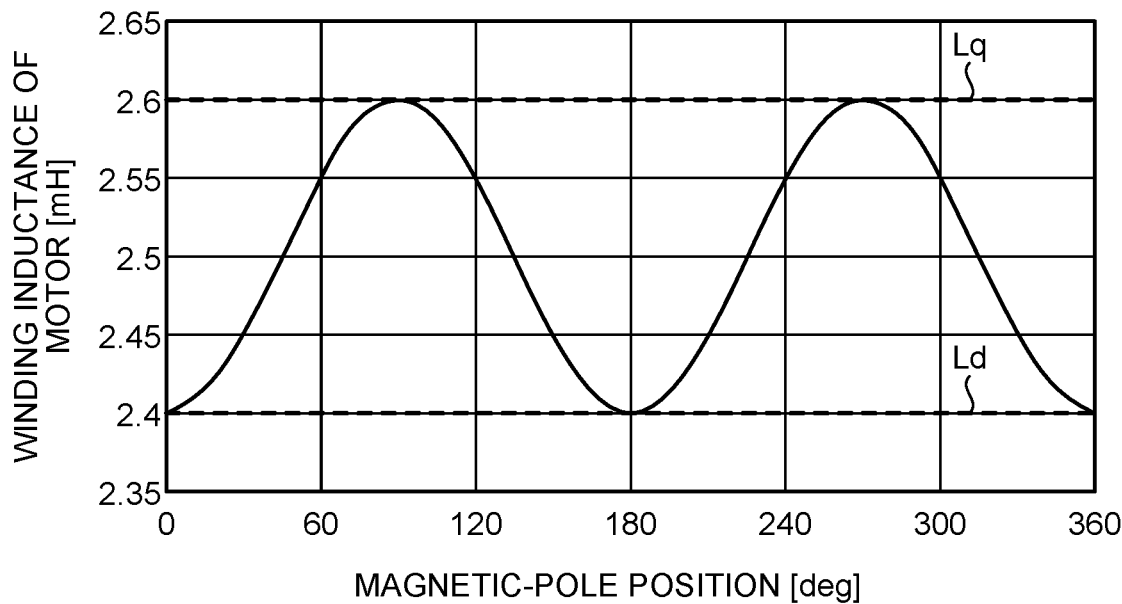
FIG. 4 is a diagram illustrating characteristics of winding inductance as seen from a stator side of the motor in the heat pump apparatus according to the first embodiment.

FIG. 4 is a diagram illustrating characteristics of the winding inductance as seen from the stator side of the motor 8 in the heat pump apparatus 100 according to the first embodiment. In FIG. 4, the horizontal axis represents a magnetic-pole position indicating the stop position of the rotor 120 estimated by the estimation unit 20 of the magnetic-pole position estimation unit 12, and the vertical axis represents the winding inductance of the motor 8. Furthermore, in FIG. 4, Lq denotes inductance in a q-axis direction of the motor 8 illustrated in FIG. 3, and Ld denotes inductance in a d-axis direction of the motor 8 illustrated in FIG. 3. When the winding inductance changes as illustrated in FIG. 4, the value of current flowing through the winding of the motor 8 also changes as illustrated in FIG. 5.

Figure 5:
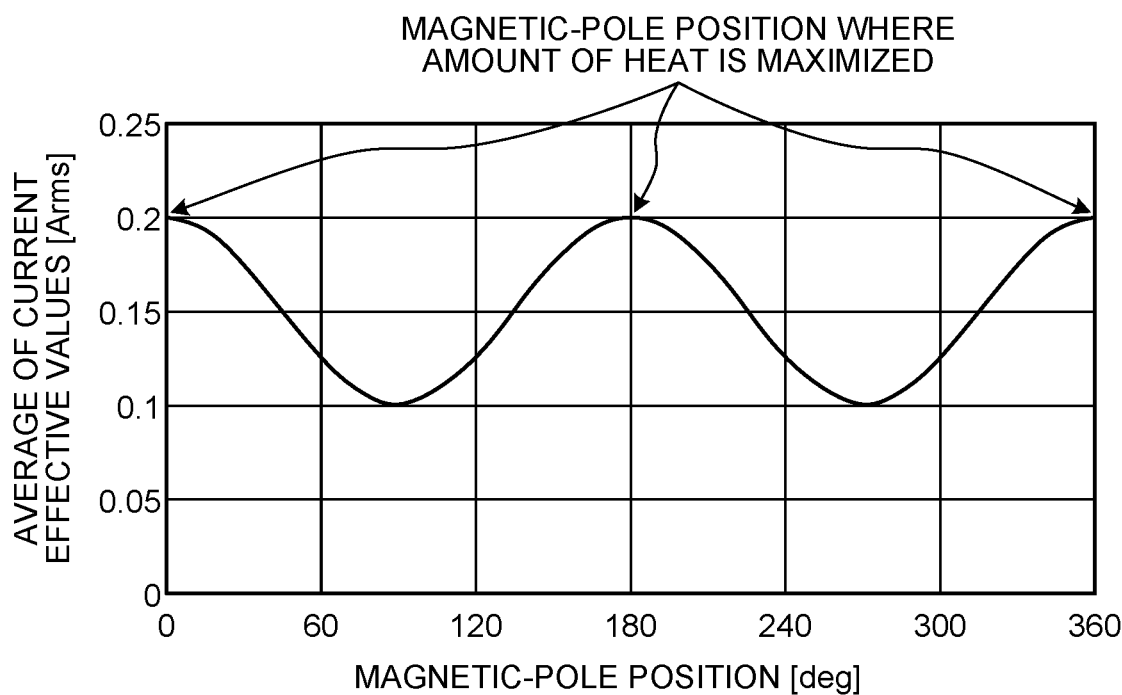
FIG. 5 is a diagram illustrating current characteristics corresponding to the winding inductance characteristics illustrated in FIG. 4 in the heat pump apparatus according to the first embodiment.

FIG. 5 is a diagram illustrating current characteristics corresponding to the winding inductance characteristics illustrated in FIG. 4 in the heat pump apparatus 100 according to the first embodiment. In FIG. 5, the horizontal axis represents the magnetic-pole position indicating the stop position of the rotor 120 estimated by the estimation unit 20 of the magnetic-pole position estimation unit 12, and the vertical axis represents the average of current effective values that are values of current detected by the current detection unit 31. In the heat pump apparatus 100, when the winding inductance changes as illustrated in FIG. 4, the values of current detected by the current detection unit 31 also change as illustrated in FIG. 5. In this manner, the values of current detected by the current detection unit 31, that is, the currents flowing through the motor 8 also change depending on the magnetic-pole position indicating the stop position of the rotor 120. When current flowing through the motor 8 changes, the amount of heat that can be applied to the compressor 1 by the inverter 9, that is, the amount of heat generation of the compressor 1 also changes.

Note that the present embodiment is based on the assumption that the number of the magnets 122 included in the rotor 120 is four as illustrated in FIG. 3, but this is an example, and the number of the magnets 122 is not limited thereto. The number of the magnets 122 included in the rotor 120 may also be any number other than four. As the number of the magnets 122 included in the rotor 120 increases, the interval between peaks and the interval between troughs decrease in sine waves illustrated in FIGS. 4 and 5. In addition, as the number of the magnets 122 included in the rotor 120 decreases, the interval between the peaks and the interval between the troughs increase in the sine waves illustrated in FIGS. 4 and 5.

The description returns to FIGS. 1 and 2. When the magnetic-pole position indicating the stop position of the rotor 120 is estimated in the magnetic-pole position estimation unit 12, the estimation energization phase command unit 21 controls the voltage phase θa* of the voltage command value Va* for causing the drive-signal generation unit 15 to output the high-frequency voltage. When the magnetic-pole position indicating the stop position of the rotor 120 is estimated in the magnetic-pole position estimation unit 12, the estimation voltage command unit 22 controls the amplitude of the voltage command value Va* for causing the drive-signal generation unit 15 to output the high-frequency voltage.

The steady heating control unit 13 is used to heat the compressor 1. When the drive-signal generation unit 15 applies the high-frequency voltage to the motor 8 to heat the compressor 1, the steady heating control unit 13 determines the amplitude and voltage phase θb* of a voltage command value Vb* from the maximum-heat-amount acquisition magnetic-pole position and a defined necessary amount of heat. The steady heating control unit 13 controls the drive-signal generation unit 15 so as to cause the drive-signal generation unit 15 to output a high-frequency voltage that the motor 8 cannot follow and to output, as inverter drive signals, PWM signals for heating the compressor 1 without rotatably driving the motor 8. The steady heating control unit 13 includes a heating energization phase command unit 23 and a heating voltage command unit 24. When the steady heating control unit 13 heats the compressor 1, the heating energization phase command unit 23 controls the voltage phase θb* of the voltage command value Vb* for causing the drive-signal generation unit 15 to output the high-frequency voltage, based on a result of estimation made by the magnetic-pole position estimation unit 12. When the steady heating control unit 13 heats the compressor 1, the heating voltage command unit 24 controls the amplitude of the voltage command value Vb* for causing the drive-signal generation unit 15 to output the high-frequency voltage. As described above, the steady heating control unit 13 controls the voltage phase θb* of the voltage command value Vb* based on the result of estimation of the magnetic-pole position indicating the stop position of the rotor 120 of the motor 8, the estimation being made by the magnetic-pole position estimation unit 12. Based on the control, the steady heating control unit 13 warms a liquid refrigerant staying in the compressor 1 to vaporize the liquid refrigerant in a short time, and discharges the vaporized liquid refrigerant from the compressor 1.

The control switching determination unit 14 causes one of the magnetic-pole position estimation unit 12 and the steady heating control unit 13 to operate. The control switching determination unit 14 generates and outputs a mode switching signal for choosing which one of the magnetic-pole position estimation unit 12 and the steady heating control unit 13 is to operate. In accordance with the mode switching signal, the control switching determination unit 14 switches between outputting, to the drive-signal generation unit 15, the voltage phase θa* and the voltage command value Va* output from the magnetic-pole position estimation unit 12 and outputting, to the drive-signal generation unit 15, the voltage phase θb* and the voltage command value Vb* output from the steady heating control unit 13. When causing the magnetic-pole position estimation unit 12 to operate, the control switching determination unit 14 outputs, as a voltage command value V* and a high-frequency phase command θk*, the voltage command value Va* and the voltage phase θa* acquired from the magnetic-pole position estimation unit 12. When causing the steady heating control unit 13 to operate, the control switching determination unit 14 outputs, as the voltage command value V* and the high-frequency phase command θk*, the voltage command value Vb* and the voltage phase θb* acquired from the steady heating control unit 13. The control switching determination unit 14 determines details of the mode switching signal on the basis of the values of the three-phase motor currents iu, iv, and iw detected by the current detection unit 31. Furthermore, the control switching determination unit 14 determines whether to switch to operation of the magnetic-pole position estimation unit 12 on the basis of the values of current detected by the current detection unit 31 during operation of the steady heating control unit 13.

The drive-signal generation unit 15 generates a high-frequency voltage command Vk* on the basis of the voltage command value V* output from the control switching determination unit 14 and the bus voltage Vdc detected by the voltage sensor 30. Specifically, the drive-signal generation unit 15 generates the high-frequency voltage command Vk* with formula (1) below.

$$Vk^* = V^* \times \sqrt{2}/Vdc \quad (1)$$

The drive-signal generation unit 15 includes a voltage command value generation unit 25 and a PWM signal generation unit 26. The voltage command value generation unit 25 generates three-phase voltage command values Vu*, Vv*, and Vw* for the three phases on the basis of the high-frequency phase command θk* output from the control switching determination unit 14 and the high-frequency voltage command Vk*. The PWM signal generation unit 26 generates the PWM signals UP, VP, WP, UN, VN, and WN on the basis of the three-phase voltage command values Vu*, Vv*, and Vw*. The drive-signal generation unit 15 causes the inverter 9 to apply voltage to the motor 8, by outputting the PWM signals UP, VP, WP, UN, VN, and WN to the switching elements 9a, 9b, 9c, 9d, 9e, and 9f, respectively, to drive the inverter 9. At this time, the drive-signal generation unit 15 can heat the compressor 1 including the motor 8 by applying such a high-frequency voltage that the rotor 120 of the motor 8 does not rotate.

Note that the drive-signal generation unit 15 also generates the PWM signals when the heat pump apparatus 100 operates under the control of the normal operation control unit 11. In this case, the drive-signal generation unit 15 generates the PWM signals by using the same generation method as the generation method used in the case of performing heating control. In other words, the normal operation control unit 11 outputs, to the drive-signal generation unit 15, information different from the high-frequency voltage command Vk* and the high-frequency phase command θk* in the above example.

Figure 6:
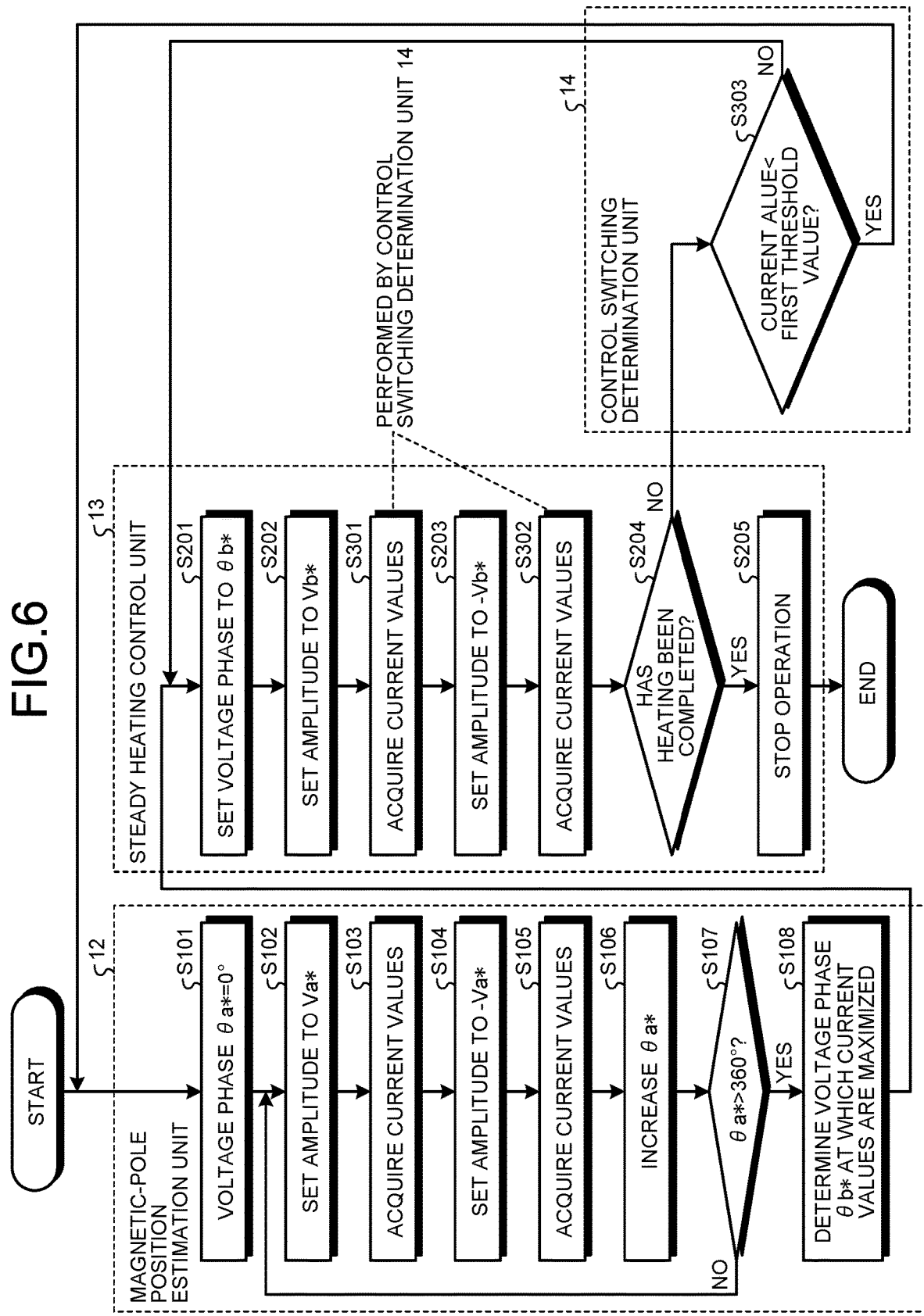
FIG. 6 is a flowchart illustrating operation of an inverter control unit of the heat pump apparatus according to the first embodiment.

Operation of the inverter control unit 10 will be described. FIG. 6 is a flowchart illustrating operation of the inverter control unit 10 of the heat pump apparatus 100 according to the first embodiment. Specifically, the flowchart given in FIG. 6 illustrates operation of the magnetic-pole position estimation unit 12, the steady heating control unit 13, and the control switching determination unit 14 of the inverter control unit 10.

When the inverter control unit 10 starts heating the compressor 1, first, the control switching determination unit 14 outputs a mode switching signal for instructing the magnetic-pole position estimation unit 12 to operate. In the magnetic-pole position estimation unit 12, the estimation energization phase command unit 21 sets the voltage phase θa*=0° as the voltage phase of the voltage command value Va* to be output to the control switching determination unit 14 (step S101). Furthermore, the estimation voltage command unit 22 sets, to Va*, the amplitude of the voltage command value Va* to be output to the control switching determination unit 14 (step S102). The amplitude of the voltage command value Va* is here denoted by Va*.

Figure 7:
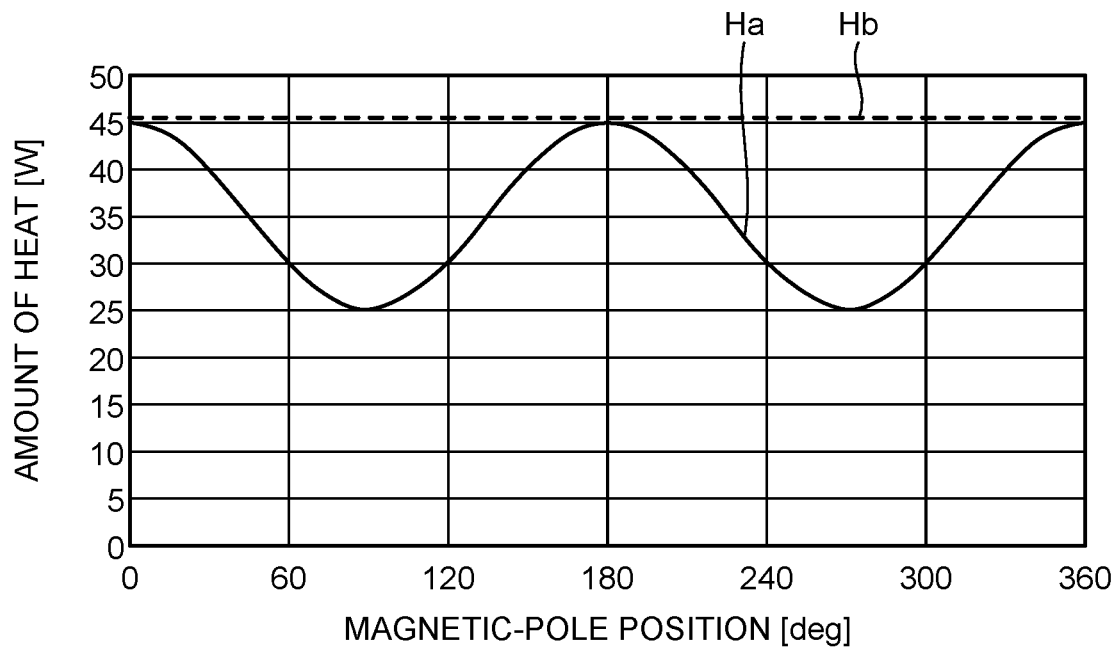
FIG. 7 is a diagram illustrating an amount of heat to be applied under the control of a magnetic-pole position estimation unit and a heating target value for a steady heating control unit in the heat pump apparatus according to the first embodiment.

The estimation voltage command unit 22 determines the amplitude of the voltage command value Va* through a method as will be described here. The estimation voltage command unit 22 determines the amplitude of the voltage command value Va* on the basis of the characteristic of a heat amount Ha for magnetic-pole position estimation. The heat amount Ha is obtained in advance by a user through an experiment or the like. As illustrated in FIG. 7, the heat amount Ha changes depending on the magnetic-pole position. FIG. 7 is a diagram illustrating the heat amount Ha that is the amount of heat to be applied under the control of the magnetic-pole position estimation unit 12 and a heating target value Hb for the steady heating control unit 13 in the heat pump apparatus 100 according to the first embodiment. In FIG. 7, the horizontal axis represents the magnetic-pole position indicating the stop position of the rotor 120 estimated by the estimation unit 20 of the magnetic-pole position estimation unit 12, and the vertical axis represents the amount of heat. The estimation voltage command unit 22 determines the amplitude of the voltage command value Va* such that the heat amount Ha that is the amount of heat to be applied under the control of the magnetic-pole position estimation unit 12 is equal to or less than the heating target value Hb for the steady heating control unit 13 at any magnetic-pole position. Note that the present embodiment is based on the assumption that the amount of heat to be applied to the motor 8 under the control of the inverter control unit 10 is equal to the amount of heat generated in the motor 8.

Reference is made back to the flowchart of FIG. 6. With the above setting done, the estimation unit 20 acquires the values of current detected by the current detection unit 31 (step S103). The estimation voltage command unit 22 sets, to −Va*, the amplitude of the voltage command value Va* to be output to the control switching determination unit 14 (step S104). When Va* is rotated through 180°, the amplitude of the voltage command value Va* is denoted by −Va*. The estimation unit 20 acquires the values of current detected by the current detection unit 31 with the above setting done (step S105). The estimation energization phase command unit 21 increases the voltage phase θa* of the voltage command value Va* to be output to the control switching determination unit 14 (step S106). Regarding the amount of increase in the voltage phase θa*, the estimation energization phase command unit 21 may increase the voltage phase θa* by a predetermined amount, or may change the amount of increase in accordance with the current values acquired by the estimation unit 20.

Figure 8:
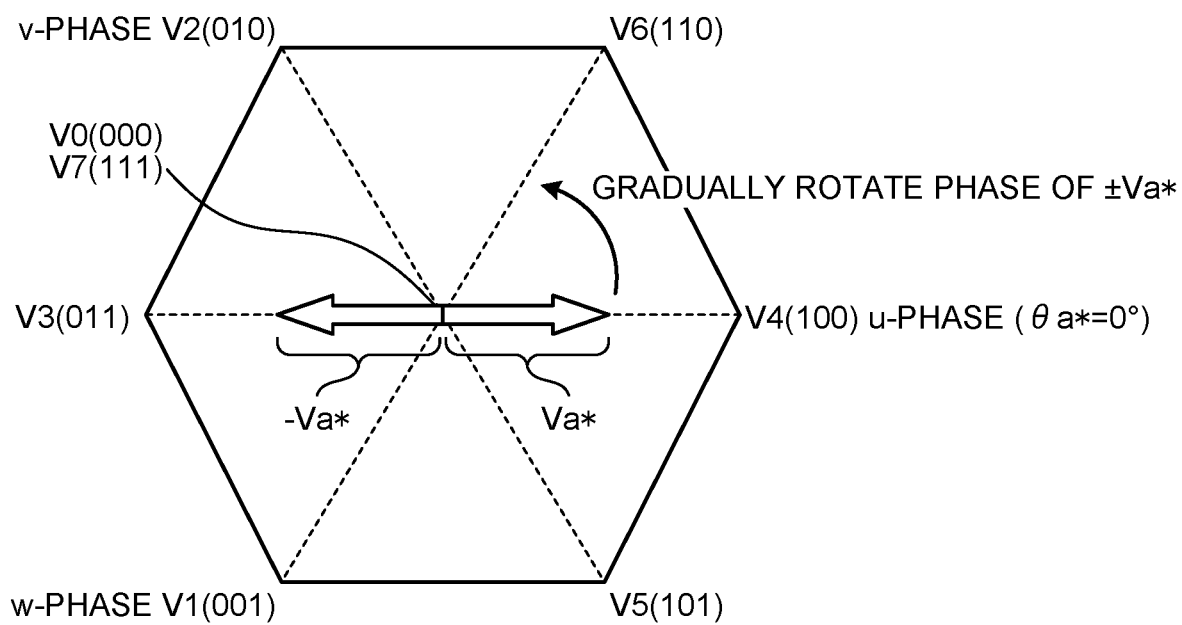
FIG. 8 is a diagram illustrating images of a voltage command value and a voltage phase, the voltage command value being to be output from the magnetic-pole position estimation unit of the heat pump apparatus according to the first embodiment.

FIG. 8 is a diagram illustrating images of the voltage command value Va* and the voltage phase θa*, the voltage command value Va* being to be output from the magnetic-pole position estimation unit 12 of the heat pump apparatus 100 according to the first embodiment. The magnetic-pole position estimation unit 12 switches the amplitude of the voltage command value Va* between a positive amplitude and a negative amplitude, and alternately outputs the voltage command values Va* with the positive amplitude and the voltage command values Va* with the negative amplitude. In addition, the magnetic-pole position estimation unit 12 changes the voltage phase θa* in the range of 0 to 360° as appropriate. The average of the motor current effective values for each energization phase obtained under such control provides a characteristic, as illustrated in FIG. 5 described above, under the influence of inductance characteristic for each magnetic-pole position. As a result, the magnetic-pole position estimation unit 12 can detect a voltage phase at which the motor current effective values are maximized, that is, the amount of heat is maximized, without excessively heating the compressor 1 and the motor 8.

Reference is made back to the flowchart of FIG. 6. When the voltage phase θa* increased by the estimation energization phase command unit 21 is 360° or less (step S107: No), the operation of the magnetic-pole position estimation unit 12 returns to step S102, and performs the same operation as described above. When the voltage phase θa* increased by the estimation energization phase command unit 21 exceeds 360° (step S107: Yes), the estimation unit 20 determines the voltage phase θb* at which the current values are maximized (step S108).

Note that the magnetic-pole position estimation unit 12, which reverses the polarity of the voltage command value Va*, does the equivalent to outputting the voltage command value Va* with its amplitude rotated through 180°. The magnetic-pole position estimation unit 12 may therefore set the amount of change in the voltage phase θa* in the range of 0 to 180°. It is also possible to achieve the amount of change in the voltage phase θa* in the range of 180 to 360° by reversing the polarity of the voltage command value Va*. Furthermore, the change in the characteristic as illustrated in each of FIGS. 4, 5, and 7 varies depending on the number of the magnets 122 of the rotor 120. In the case of the characteristics illustrated in, for example, FIGS. 4, 5, and 7, therefore, the magnetic-pole position estimation unit 12 may set the amount of change in the voltage phase θa* in the range of 0 to 90°. In this case, the magnetic-pole position estimation unit 12 can detect, for example, a magnetic-pole position where the amount of heat is maximized in FIG. 5, or a magnetic-pole position shifted 90° from the magnetic-pole position where the amount of heat is maximized, that is, a magnetic-pole position where the amount of heat is minimized. When detecting the magnetic-pole position where the amount of heat is maximized, the magnetic-pole position estimation unit 12 uses the magnetic-pole position as it is. When detecting the magnetic-pole position where the amount of heat is minimized, the magnetic-pole position estimation unit 12 uses, as the magnetic-pole position where the amount of heat is maximized, a magnetic-pole position shifted 90° from the magnetic-pole position where the amount of heat is minimized.

As discussed above, the magnetic-pole position estimation unit 12 determines the amplitude of the voltage command value Va* from the necessary amount of heat, changes the voltage phase θa* of the voltage command value Va* within a defined range, switches the voltage command value Va* between the positive voltage command value Va* and the negative voltage command value Va*, and alternately outputs the positive and negative voltage command values Va*. Furthermore, the magnetic-pole position estimation unit 12 estimates that a magnetic-pole position where the current values acquired from the current detection unit 31 are maximized is the maximum-heat-amount acquisition magnetic-pole position. The amplitude of the voltage command value Va* may be hereinafter referred to as a first amplitude.

The control switching determination unit 14 acquires the voltage phase θa* from the estimation energization phase command unit 21 of the magnetic-pole position estimation unit 12. It is thus possible for the control switching determination unit 14 to determine whether the voltage phase θa* exceeds 360°. When the voltage phase θa* has exceeded 360°, the control switching determination unit 14 stops outputting the mode switching signal for instructing the magnetic-pole position estimation unit 12 to operate, after the lapse of processing time during which the estimation unit 20 of the magnetic-pole position estimation unit 12 determines the voltage phase θb* in step S108.

Next, the control switching determination unit 14 outputs a mode switching signal for instructing the steady heating control unit 13 to operate. In the steady heating control unit 13, on the basis of the voltage phase θb* acquired from the estimation unit 20 of the magnetic-pole position estimation unit 12, the heating energization phase command unit 23 sets the voltage phase θb* as the voltage phase of the voltage command value Vb* to be output to the control switching determination unit 14 (step S201). Note that the heating energization phase command unit 23 of the steady heating control unit 13 may determine, in step S108, the voltage phase θb* at which the current values are maximized. The heating voltage command unit 24 sets, to Vb*, the amplitude of the voltage command value Vb* to be output to the control switching determination unit 14 (step S202). The amplitude of the voltage command value Vb* is here denoted by Vb*. The steady heating control unit 13 performs heating control by outputting the voltage command value Vb* with the voltage phase θb* obtained by the magnetic-pole position estimation unit 12. The voltage phase θb* is a voltage phase at which the motor current effective values are maximized. Note that a specific method for heating control is not limited, and a method may be used which is similar to a conventional method such as the method described in Patent Literature 1 above.

The control switching determination unit 14 acquires the values of current detected by the current detection unit 31 with the above setting done (step S301). The heating voltage command unit 24 sets, to −Vb*, the amplitude of the voltage command value Vb* to be output to the control switching determination unit 14 (step S203). When Vb* is rotated through 180°, the amplitude of the voltage command value Vb* is denoted by −Vb*. The control switching determination unit 14 acquires the values of current detected by the current detection unit 31 with the above setting done (step S302).

When the heating of the compressor 1 has not been completed (step S204: No), the control switching determination unit 14 determines whether the current values acquired in steps S301 and S302 are less than a predetermined first threshold value (step S303). That is, the control switching determination unit 14 determines whether the magnetic-pole position that is the stop position of the rotor 120 has changed due to, for example, a difference in pressure in the compressor 1 while the steady heating control unit 13 heats compressor 1. A current value to be compared with the first threshold value refers to the average of current effective values. In a case where the voltage phase θb* is at a magnetic-pole position where the amount of heat is maximized as illustrated in FIG. 5 while the steady heating control unit 13 heats the compressor, the average of the motor current effective values is maximized. When the magnetic-pole position changes due to, for example, a difference in pressure in the compressor 1, therefore, the voltage phase θb* shifts from the magnetic-pole position where the amount of heat is maximized, that is, changes in such a direction that the motor current effective values are reduced. When the motor current effective values are less than the first threshold value, thus, the control switching determination unit 14 causes the magnetic-pole position estimation unit 12 to operate again and estimate a magnetic-pole position again. The first threshold value is 0.18 Arms in the example of FIG. 5, which is smaller than 0.2 Arms. The control switching determination unit 14 can detect a change in the magnetic-pole position with higher accuracy as the first threshold value is closer to the average of current effective values obtained at a magnetic-pole position where the amount of heat is maximized.

When the current value is equal to or greater than the first threshold value (step S303: No), the control switching determination unit 14 determines that the stop position of the rotor 120 of the motor 8 has not changed or the amount of change is negligibly small, and continues to output the mode switching signal for instructing the steady heating control unit 13 to operate. The steady heating control unit 13 repeatedly performs the above-described operation. When the current value is less than the first threshold value (step S303: Yes), the control switching determination unit 14 determines that the stop position of the rotor 120 of the motor 8 has changed, and stops outputting the mode switching signal for instructing the steady heating control unit 13 to operate. Then, in order to estimate again a magnetic-pole position indicating the stop position of the rotor 120 of the motor 8, the control switching determination unit 14 outputs a mode switching signal for instructing the magnetic-pole position estimation unit 12 to operate. The magnetic-pole position estimation unit 12 repeatedly performs the above-described operation. As discussed above, when the average of the current values falls below the defined first threshold value during the operation of the steady heating control unit 13, the control switching determination unit 14 stops the operation of the steady heating control unit 13, and causes the magnetic-pole position estimation unit 12 to operate. Note that the control switching determination unit 14 may provide hysteresis to the first threshold value so that hunting does not occur in a transition of operation between the magnetic-pole position estimation unit 12 and the steady heating control unit 13.

When the heating of the compressor 1 has been completed (step S204: Yes), the steady heating control unit 13 stops outputting the voltage phase θb* and the voltage command value Vb* to the control switching determination unit 14, and stops its operation (step S205). As discussed above, the steady heating control unit 13 determines the amplitude of the voltage command value Vb* from the maximum-heat-amount acquisition magnetic-pole position and the necessary amount of heat, switches the voltage command value Vb* between the positive voltage command value Vb* and the negative voltage command value Vb*, alternately outputs the positive and negative voltage command values Vb*. The amplitude of the voltage command value Vb* may be hereinafter referred to as a second amplitude. The relationship between the second amplitude and the first amplitude described above is expressed as follows: second amplitude-≥first amplitude.

Note that whether the heating of the compressor 1 has been completed may be determined by the steady heating control unit 13 or the control switching determination unit 14 in step S204.

Figure 9:
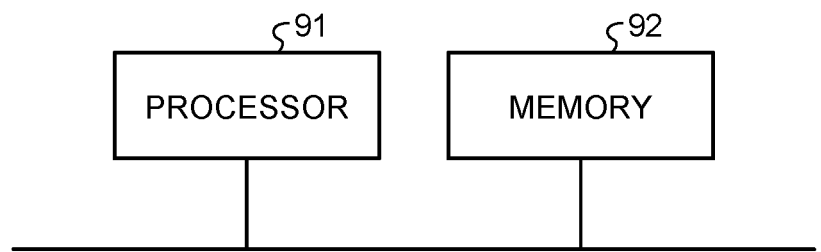
FIG. 9 is a diagram showing an example of a hardware configuration that implements the inverter control unit included in the heat pump apparatus according to the first embodiment.

Next, a description will be given of a hardware configuration of the inverter control unit 10 included in the heat pump apparatus 100. FIG. 9 is a diagram showing an example of a hardware configuration that implements the inverter control unit 10 included in the heat pump apparatus 100 according to the first embodiment. The inverter control unit 10 is implemented by a processor 91 and a memory 92.

The processor 91 is a central processing unit (CPU, also referred to as a processing device, an arithmetic device, a microprocessor, a microcomputer, a processor, or a digital signal processor (DSP)) or a system large-scale integration (LSI). Examples of the memory 92 include nonvolatile or volatile semiconductor memories such as a random access memory (RAM), a read only memory (ROM), a flash memory, an erasable programmable read only memory (EPROM), and an electrically erasable programmable read only memory (EEPROM) (registered trademark). Furthermore, the memory 92 is not limited thereto, and may be a magnetic disk, an optical disk, a compact disk, a mini disk, or a digital versatile disc (DVD).

As described above, according to the present embodiment, the magnetic-pole position estimation unit 12 in the heat pump apparatus 100 estimates the stop position of the rotor 120 from the values of current detected by the current detection unit 31 to estimate a maximum-heat-amount acquisition magnetic-pole position. The steady heating control unit 13 performs heating control at the maximum-heat-amount acquisition magnetic-pole position estimated by the magnetic-pole position estimation unit 12. Thus, the heat pump apparatus 100 can efficiently heat the compressor 1 while preventing an increase in circuit size. Using motor current information alone without using induced voltage information on the motor 8, the heat pump apparatus 100 can detect a change in the magnetic-pole position indicating the stop position of the rotor 120. The heat pump apparatus 100 can stably obtain the maximum amount of heat in the heating control of the compressor 1.

Furthermore, when the magnetic-pole position changes, the control switching determination unit 14 of the heat pump apparatus 100 causes the magnetic-pole position estimation unit 12 to estimate a maximum-heat-amount acquisition magnetic-pole position again. The heat pump apparatus 100 can thus quickly change the voltage phase to a voltage phase at which the maximum amount of heat is acquired. In the heat pump apparatus 100 of the present embodiment, the magnetic-pole position estimation unit 12 estimates a maximum-heat-amount acquisition magnetic-pole position, and then the steady heating control unit 13 performs heating control at the maximum-heat-amount acquisition magnetic-pole position. If necessary, the magnetic-pole position estimation unit 12 estimates a maximum-heat-amount acquisition magnetic-pole position again. As described above, the heat pump apparatus 100 can avoid the refrigerant stagnation phenomenon by stably and efficiently heating the compressor 1 with the inexpensive circuit configuration, regardless of the stop position of the rotor 120 of the motor 8 of the compressor 1, that is, the magnetic-pole position.

Second Embodiment

In a second embodiment, the control switching determination unit 14 determines whether a magnetic-pole position has changed, in a manner different from that in the first embodiment, as will be described below.

In a case where the stop position of the rotor 120, that is, the magnetic-pole position has changed due to, for example, a difference in pressure in the compressor 1 while the steady heating control unit 13 heat the compressor, the induced voltage of the motor 8 varies depending on a rotational speed at which the rotor 120 was rotating when the magnetic-pole position changed. Furthermore, as illustrated in FIG. 4, the winding inductance of the motor 8 changes as the stop position of the rotor 120, that is, the magnetic-pole position changes. A change in the induced voltage and the winding inductance cause a change in the current ratio between a phase in which the maximum one of the three-phase currents of the motor 8 flows and the other two phases. In view of this, the control switching determination unit 14 uses the amount of change in the current ratio to thereby detect whether the stop position of the rotor 120, that is, the magnetic-pole position has changed.

Figure 10:
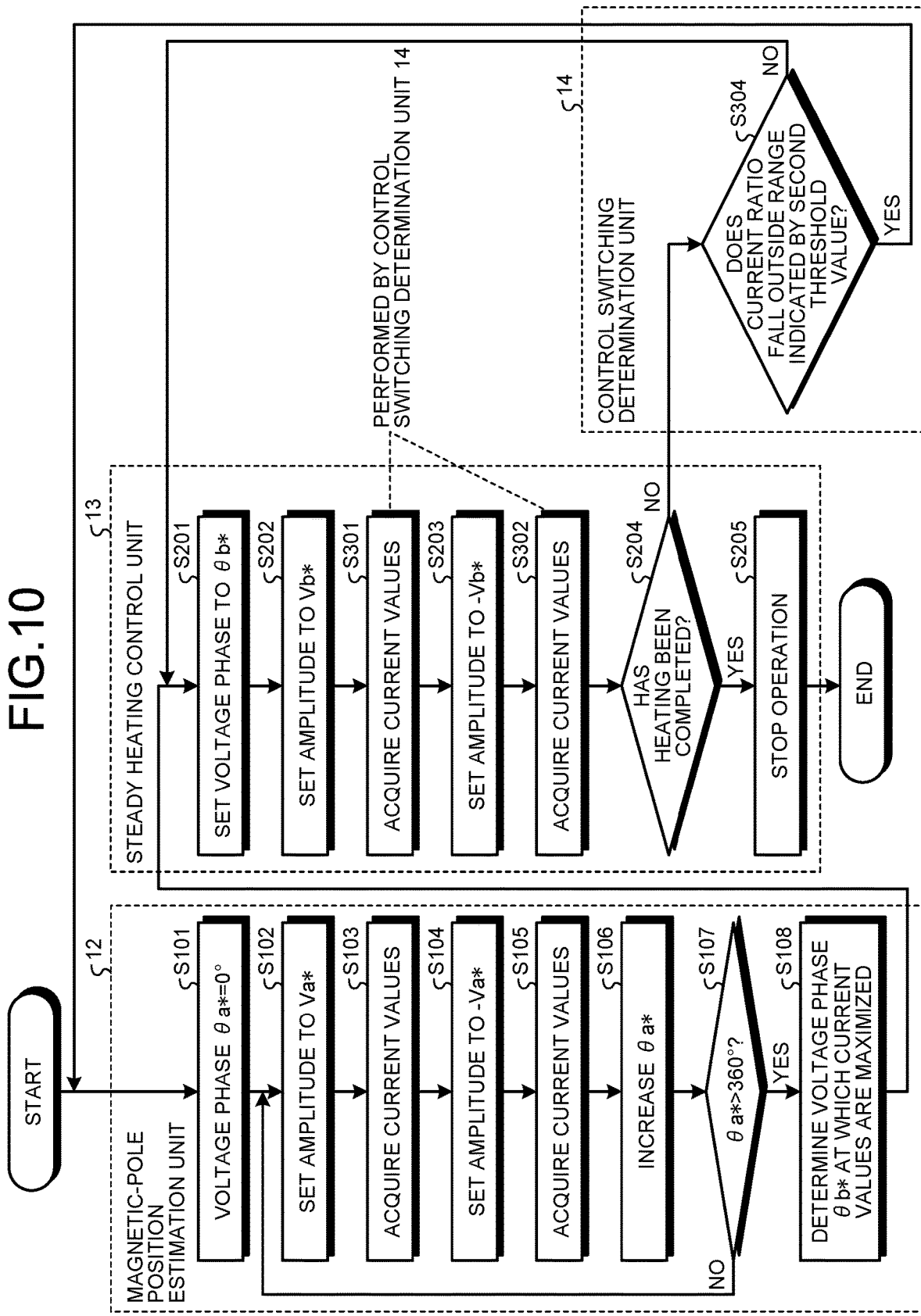
FIG. 10 is a flowchart illustrating operation of an inverter control unit included in a heat pump apparatus according to a second embodiment.

FIG. 10 is a flowchart illustrating operation of the inverter control unit 10 of the heat pump apparatus 100 according to the second embodiment. The flowchart illustrated in FIG. 10 is the flowchart in the first embodiment illustrated in FIG. 6 with the operation in step S303 replaced with an operation in step S304.

When the heating of the compressor 1 has not been completed (step S204: No), the control switching determination unit 14 determines, on the basis of the current values acquired in steps S301 and S302, whether the ratio of the currents of the two phases other than the phase to the current of the phase that is maximum among the currents of the motor 8 obtained from the current values falls outside a range specified by a defined second threshold value (step S304). When the stop position of the rotor 120, that is, the magnetic-pole position changes, the current ratio between the phase in which the maximum one of the three-phase currents of the motor 8 flows and the other two phases may increase or decrease depending on the phase in which the maximum current flows. In the present embodiment, thus, the second threshold value is defined as indicating a range of the current ratio.

When the current ratio falls within the range indicated by the second threshold value (step S304: No), the control switching determination unit 14 determines that the stop position of the rotor 120 of the motor 8 has not changed or the amount of change is negligibly small, and continues to output the mode switching signal for instructing the steady heating control unit 13 to operate. The steady heating control unit 13 repeatedly performs the above-described operation. When the current ratio falls outside the range indicated by the second threshold value (step S304: Yes), the control switching determination unit 14 determines that the stop position of the rotor 120 of the motor 8 has changed, and stops outputting the mode switching signal for instructing the steady heating control unit 13 to operate. Then, in order to estimate again a magnetic-pole position indicating the stop position of the rotor 120 of the motor 8, the control switching determination unit 14 outputs a mode switching signal for instructing the magnetic-pole position estimation unit 12 to operate. The magnetic-pole position estimation unit 12 repeatedly performs the above-described operation.

As described above, according to the present embodiment, when the ratio of the currents of the two phases other than the other phase to a current of the other phase that is maximum among the currents of the motor 8 obtained from the current values, falls outside the range specified by the defined second threshold value during the operation of the steady heating control unit 13, the control switching determination unit 14 stops operation of the steady heating control unit 13, and causes the magnetic-pole position estimation unit 12 to operate. Also in this case, the heat pump apparatus 100 can obtain the same effect as that in the first embodiment.

Third Embodiment

In a third embodiment, the control switching determination unit 14 determines whether a magnetic-pole position has changed, in a manner different from those in the first and second embodiments, as will be described below.

Figure 11:
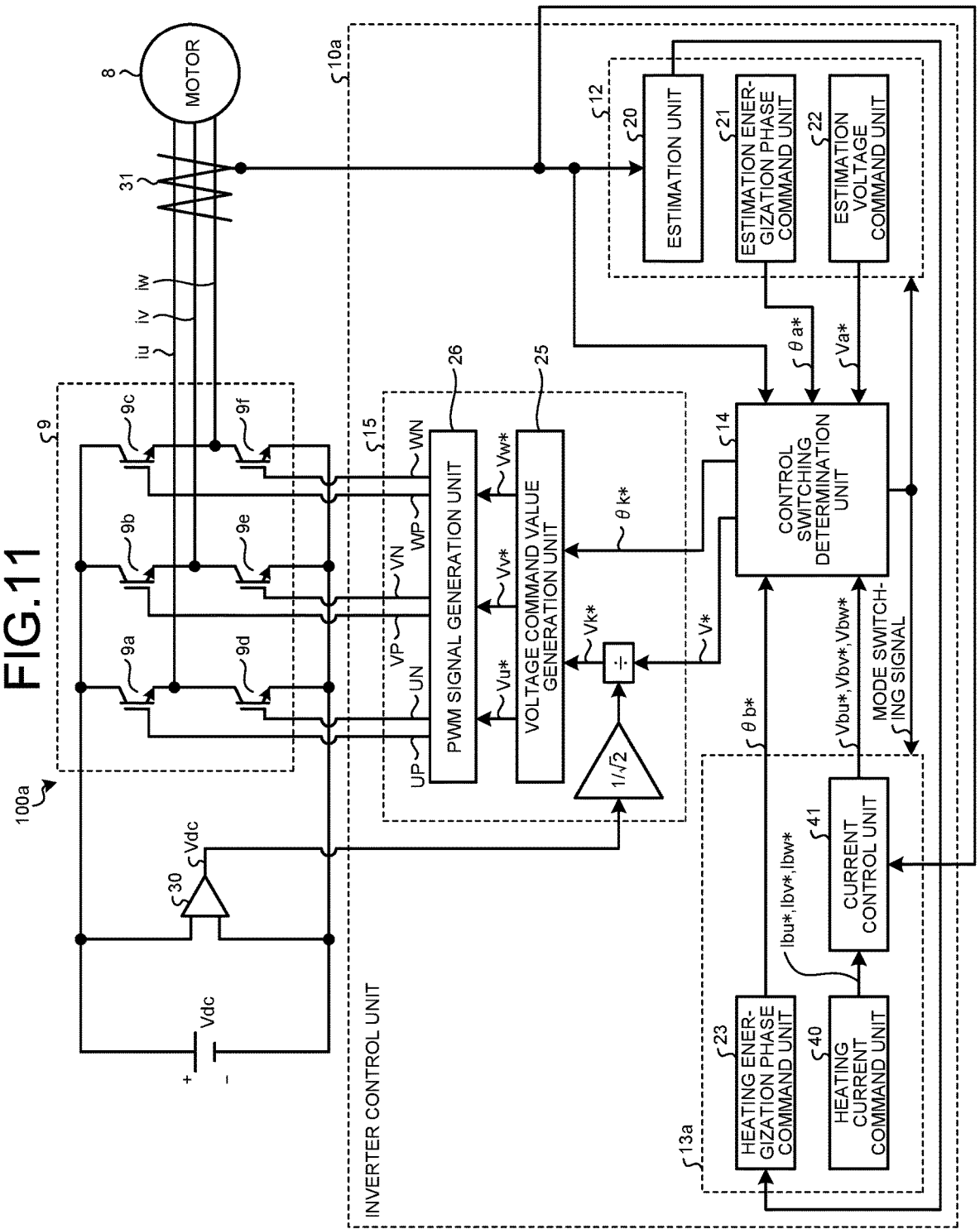
FIG. 11 is a diagram showing an example of a configuration of a main part of a heat pump apparatus according to a third embodiment.

FIG. 11 is a diagram showing an example of a configuration of a main part of a heat pump apparatus 100a according to the third embodiment. The heat pump apparatus 100a is the heat pump apparatus 100 of the first embodiment illustrated in FIG. 2 with the inverter control unit 10 replaced with an inverter control unit 10a. The inverter control unit 10a is the inverter control unit 10 of the first embodiment illustrated in FIG. 2 with the steady heating control unit 13 replaced with a steady heating control unit 13a. The steady heating control unit 13a includes the heating energization phase command unit 23, a heating current command unit 40, and a current control unit 41.

The heating current command unit 40 outputs current command values Ibu*, Ibv*, and Ibw* for obtaining the heating target value Hb when the steady heating control unit 13a operates. As with the heat amount characteristics illustrated in FIG. 7, the current command values Ibu*, Ibv*, and Ibw* just need to be determined in accordance with a desired amount of heat, after a heat amount characteristic obtained through an experiment in advance for each of the current command values Ibu*, Ibv*, and Ibw*.

The current control unit 41 acquires the current command values Ibu*, Ibv*, and Ibw* from the heating current command unit 40, and acquires current values from the current detection unit 31. The current control unit 41 outputs voltage command values Vbu*, Vbv*, and Vbw* such that the current command values Ibu*, Ibv*, and Ibw* match the current values. The current control unit 41 can obtain the voltage command values Vbu*, Vbv*, and Vbw* by, for example, general proportional integral (PI) control.

From the voltage command values Vbu*, Vbv*, and Vbw* acquired from the current control unit 41, the control switching determination unit 14 generates a voltage command value corresponding to the voltage command value Vb* of the first and second embodiments.

The heat pump apparatus 100a includes the current control unit 41. As a result, even in a case where there are variations in, for example, values of resistance of the motor 8, it is possible to control current in such a way as to obtain a desired current value. It is thus possible to prevent the occurrence of an overcurrent in the inverter 9 and to perform stable heating control. In addition, when the ratio of current values changes with the change in the stop position of the rotor 120, that is, the magnetic-pole position as described above, the current control unit 41 attempts to control the currents in accordance with the current command values Ibu*, Ibv*, and Ibw*. In this case, the voltage command values Vbu*, Vbv*, and Vbw* output from the current control unit 41 also change. During the performance of the current control, therefore, the heat pump apparatus 100a may detect a change in the stop position of the rotor 120, that is, the magnetic-pole position by using the amount of change in each of the voltage command values Vbu*, Vbv*, and Vbw*.

Figure 12:
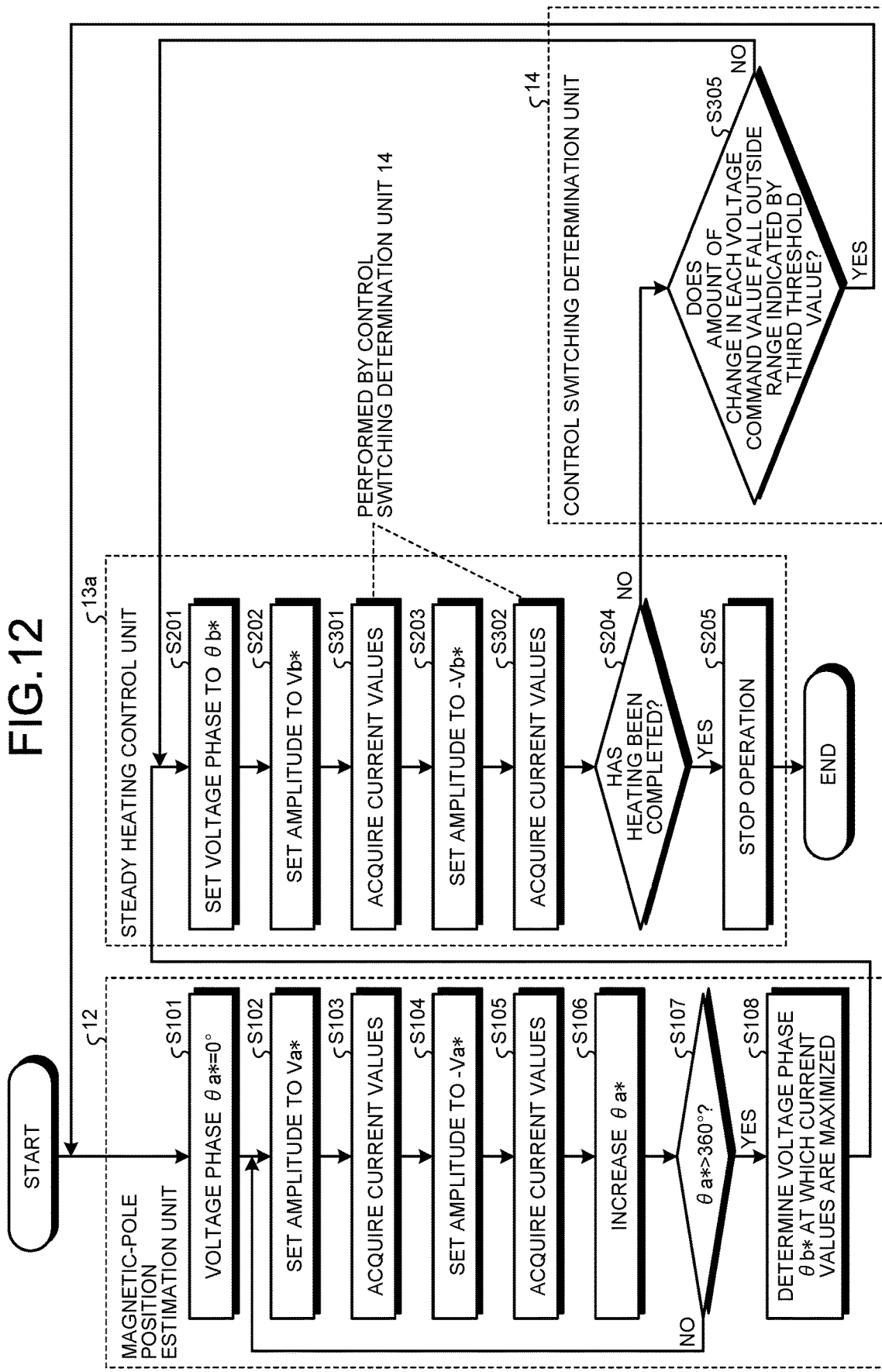
FIG. 12 is a flowchart illustrating operation of an inverter control unit of the heat pump apparatus according to the third embodiment.

FIG. 12 is a flowchart illustrating operation of the inverter control unit 10a of the heat pump apparatus 100a according to the third embodiment. The flowchart illustrated in FIG. 12 is the flowchart in the first embodiment illustrated in FIG. 6 with the operation in step S303 replaced with an operation in step S305.

When the heating of the compressor 1 has not been completed (step S204: No), the control switching determination unit 14 determines whether the amount of change in the voltage command values Vbu*, Vbv*, and Vbw* falls outside a range indicated by a defined third threshold value (step S305). When the stop position of the rotor 120, that is, the magnetic-pole position changes, the amount of change in the voltage command values Vbu*, Vbv*, and Vbw* may increase or decrease. In the present embodiment, thus, the third threshold value is defined as indicating a range of the amount of change.

When the amount of change falls within the range indicated by the third threshold value (step S305: No), the control switching determination unit 14 determines that the stop position of the rotor 120 of the motor 8 has not changed or the amount of change is negligibly small, and continues to output a mode switching signal for instructing the steady heating control unit 13a to operate. The steady heating control unit 13a repeatedly performs the above-described operation. When the amount of change falls outside the range indicated by the third threshold value (step S305: Yes), the control switching determination unit 14 determines that the stop position of the rotor 120 of the motor 8 has changed, and stops outputting the mode switching signal for instructing the steady heating control unit 13a to operate. Then, in order to estimate again a magnetic-pole position indicating the stop position of the rotor 120 of the motor 8, the control switching determination unit 14 outputs a mode switching signal for instructing the magnetic-pole position estimation unit 12 to operate. The magnetic-pole position estimation unit 12 repeatedly performs the above-described operation.

As described above, according to the present embodiment, when the amount of change in a value output from the current control unit 41 of the heat pump apparatus 100a falls outside the range indicated by the defined third threshold value during the operation of the steady heating control unit 13a, the control switching determination unit 14 stops the operation of the steady heating control unit 13a, and causes the magnetic-pole position estimation unit 12 to operate. Also in this case, the heat pump apparatus 100 can obtain the same effect as that in the first embodiment.

Fourth Embodiment

In a fourth embodiment, the control switching determination unit 14 determines whether a magnetic-pole position has changed, using the gradient of change in a current value or the like, too.

In some case, an increase in the temperatures of the compressor 1 and the motor 8 changes the resistance, inductance, etc. of the motor 8, and hence changes the current flowing through the motor 8, that is, current values detected by the current detection unit 31. In general, a change in a current value caused by a change in temperature and detected by the current detection unit 31 has a time constant longer than that of a change in the current value caused by a change in the stop position of the rotor 120, that is, the magnetic-pole position and detected by the current detection unit 31. The control switching determination unit 14 can therefore accurately detect whether the stop position of the rotor 120, that is, the magnetic-pole position has changed, by using the gradient of change in current values or the like in addition to comparison with the threshold values described in the first to third embodiments.

FIG. 13 is a flowchart illustrating operation of the inverter control unit 10 of the heat pump apparatus 100 according to the fourth embodiment. The flowchart illustrated in FIG. 13 is the flowchart in the first embodiment illustrated in FIG. 6 with an operation in step S306 added.

When the current value is less than the first threshold value (step S303: Yes), the control switching determination unit 14 further determines whether the gradient of change in the current value falls outside a range indicated by a defined fourth threshold value (step S306). When the gradient of change falls within the range indicated by the fourth threshold value (step S306: No), the control switching determination unit 14 determines that the stop position of the rotor 120 of the motor 8 has not changed or the amount of change is negligibly small, and continues to output the mode switching signal for instructing the steady heating control unit 13 to operate. The steady heating control unit 13 repeatedly performs the above-described operation. When the gradient of change falls outside the range indicated by the fourth threshold value (step S306: Yes), the control switching determination unit 14 determines that the stop position of the rotor 120 of the motor 8 has changed, and stops outputting the mode switching signal for instructing the steady heating control unit 13 to operate. Then, in order to estimate again a magnetic-pole position indicating the stop position of the rotor 120 of the motor 8, the control switching determination unit 14 outputs a mode switching signal for instructing the magnetic-pole position estimation unit 12 to operate. The magnetic-pole position estimation unit 12 repeatedly performs the above-described operation.

Note that while the present embodiment is described as being applied to the first embodiment by way of example, the present embodiment is also applicable to the second and third embodiments. When the present embodiment is applied to the second embodiment, the operation in step S306 is added such that step S306 comes after "step S304: Yes" illustrated in FIG. 10. In this case, the gradient of change in S306 is the gradient of change in the current ratio. Furthermore, when the present embodiment is applied to the third embodiment, the operation in step S306 is added such that step S306 comes after "step S305: Yes" illustrated in FIG. 12. In this case, the gradient of change in S306 is the gradient of change in the voltage command values.

As described above, according to the present embodiment, when, in addition, the gradient of change in current values falls outside the range indicated by the defined fourth threshold value, the control switching determination unit 14 stops operation of the steady heating control unit 13, and causes the magnetic-pole position estimation unit 12 to operate. As a result, the heat pump apparatus 100 can accurately detect whether the stop position of the rotor 120, that is, the magnetic-pole position has changed, as compared with the first to third embodiments.

Fifth Embodiment

In a fifth embodiment, the magnetic-pole position estimation unit 12 and the steady heating control unit 13 output voltage command values in a manner different from those in the first to fourth embodiments, as will be described below.

When the magnetic-pole position estimation unit 12 switches the polarity of the voltage command value Va* from the positive one to the negative one and from the negative one to the positive one, the magnetic-pole position estimation unit 12 may output a zero vector. Similarly, when the steady heating control unit 13 switches the polarity of the voltage command value Vb* from the positive one to the negative one and from the negative one to the positive one, the steady heating control unit 13 may output a zero vector. The zero vector is obtained when all the switching elements of the upper arm or lower arm of the inverter 9 are turned on.

The heat pump apparatus 100 can thus change an output current value of a triangular waveform to an output current value of a trapezoidal waveform by utilizing a reflux state. As a result, the heat pump apparatus 100 can increase the amount of heat to be applied due to the copper loss component of the motor 8, and can thus increase the maximum amount of heat. Note that the magnetic-pole position estimation unit 12 and the steady heating control unit 13 may be configured such that a zero vector is output every time the polarity of each voltage command value is switched, or may be configured such that the magnetic-pole position estimation unit 12 and the steady heating control unit 13 can switch between outputting a zero vector and outputting no zero vector. In this case, the inverter control unit 10 may be configured such that an upper control unit (not illustrated) in the inverter control unit 10 outputs, to the magnetic-pole position estimation unit 12 and the steady heating control unit 13, a signal for switching between outputting a zero vector and outputting no zero vector.

Although a description has been given of the case where the magnetic-pole position estimation unit 12 and the steady heating control unit 13 each output a zero vector when switching the polarity of a voltage command value from the positive one to the negative one or from the negative to the positive one, the present invention is not limited thereto. In the inverter control unit 10, when the PWM signal generation unit 26 of the drive-signal generation unit 15 switches a PWM signal from a PWM signal generated on the basis of a positive voltage command value to a PWM signal generated on the basis of a negative voltage command value and outputs the PWM signal generated on the basis of the negative voltage command value, or switches a PWM signal from a PWM signal generated on the basis of a negative voltage command value to a PWM signal generated on the basis of a positive voltage command value and outputs the PWM signal generated on the basis of the positive voltage command value, the PWM signal generation unit 26 may output PWM signals for turning on all the switching elements of the upper arm or lower arm of the inverter 9. That is, the PWM signal generation unit 26 outputs a zero vector when there is a change in the direction of output of a drive signal that is a PWM signal generated from a voltage command value generated by the magnetic-pole position estimation unit 12 or the steady heating control unit 13. Note that the PWM signal generation unit 26 may be configured such that a zero vector is output every time there is a change in the direction of output of a drive signal that is a PWM signal, or may be configured such that the PWM signal generation unit 26 can switch between outputting a zero vector and outputting no zero vector. In this case, the inverter control unit 10 may be configured such that the upper control unit (not illustrated) in the inverter control unit 10 outputs, to the PWM signal generation unit 26, a signal for switching between outputting a zero vector and outputting no zero vector.

The configurations set forth in the above embodiments show examples, and it is possible to combine the configurations with another technique that is publicly known or combine the configurations with each other, and is also possible to make omissions and changes to part of the configurations without departing from the scope of the present invention.

The invention claimed is:

1. A heat pump apparatus comprising:
a compressor including a compression mechanism and a motor, the compression mechanism compressing a refrigerant, the motor including a rotor and driving the compression mechanism;
a heat exchanger;
an inverter that applies a desired voltage to the motor;
a current detection unit that detects current flowing from the inverter to the motor;
a drive-signal generation unit that generates a drive signal for the inverter;
a magnetic-pole position estimation unit that changes a voltage phase of a voltage command value for a high-frequency voltage, and estimates a magnetic-pole position indicating a stop position of the rotor from a current value to estimate a maximum-heat-amount acquisition magnetic-pole position when the drive-signal generation unit applies the high-frequency voltage to the motor to heat the compressor, the motor being not capable of being rotatably driven with the high-frequency voltage, the high-frequency voltage being represented by a sine wave, the current value being a value of current detected by the current detection unit, a maximum amount of heat being acquired at the maximum-heat-amount acquisition magnetic-pole position;
a steady heating control unit that determines an amplitude and voltage phase of the voltage command value from the maximum-heat-amount acquisition magnetic-pole position and a defined necessary amount of heat when the drive-signal generation unit applies the high-frequency voltage to the motor to heat the compressor; and
a control switching determination unit that generates and outputs a mode switching signal for choosing which one of the magnetic-pole position estimation unit and the steady heating control unit is to operate.

2. The heat pump apparatus according to claim 1, wherein the magnetic-pole position estimation unit determines a first amplitude of the voltage command value from the necessary amount of heat, changes a voltage phase of the voltage command value with the first amplitude within a defined range, switches the voltage command value with the first amplitude between a positive voltage command value with the first amplitude and a negative voltage command value with the first amplitude, alternately outputs the positive voltage command with the first amplitude and the negative voltage command value with the first amplitude, and estimates that a magnetic-pole position where the current value is maximized is the maximum-heat-amount acquisition magnetic-pole position.

3. The heat pump apparatus according to claim 2, wherein the steady heating control unit determines a second amplitude that is equal to or greater than the first amplitude, from the maximum-heat-amount acquisition magnetic-pole position and the necessary amount of heat, switches the voltage command value with the second amplitude between a positive voltage command value with the second amplitude and a negative voltage command value with the second amplitude value, and alternately outputs the positive voltage command value with the second amplitude and the negative voltage command value with the second amplitude.

4. The heat pump apparatus according to claim 1, wherein when an average of current values falls below a defined first threshold value during an operation of the steady heating control unit, the control switching determination unit stops the operation of the steady heating control unit, and causes the magnetic-pole position estimation unit to operate.

5. The heat pump apparatus according to claim 1, wherein when a ratio of currents of two phases other than a phase to a current of the phase that is maximum among currents of the motor obtained from the current value falls outside a range specified by a defined second threshold value during an operation of the steady heating control unit, the control switching determination unit stops the operation of the steady heating control unit, and causes the magnetic-pole position estimation unit to operate.

6. The heat pump apparatus according to claim 1, wherein when an amount of change in a value output from a current control unit of the heat pump apparatus falls outside a range indicated by a defined third threshold value during an operation of the steady heating control unit, the control switching determination unit stops the operation of the steady heating control unit, and causes the magnetic-pole position estimation unit to operate.

7. The heat pump apparatus according to claim 4, wherein when, in addition, a gradient of change in the current value falls outside a range indicated by a defined fourth threshold value, the control switching determination unit stops the operation of the steady heating control unit, and causes the magnetic-pole position estimation unit to operate.

8. The heat pump apparatus according to claim 1, wherein the drive-signal generation unit outputs a zero vector when there is a change in a direction of output of a drive signal generated from the voltage command value.

9. The heat pump apparatus according to claim 5, wherein when, in addition, a gradient of change in the current value falls outside a range indicated by a defined fourth threshold value, the control switching determination unit stops the operation of the steady heating control unit, and causes the magnetic-pole position estimation unit to operate.

10. The heat pump apparatus according to claim 6, wherein when, in addition, a gradient of change in the current value falls outside a range indicated by a defined fourth threshold value, the control switching determination unit stops the operation of the steady heating control unit, and causes the magnetic-pole position estimation unit to operate.

* * * * *